Aug. 9, 1949.  W. J. HERZIGER  2,478,693
ELECTRIC MOTOR CONTROL SYSTEM AND APPARATUS
Filed Jan. 19, 1946
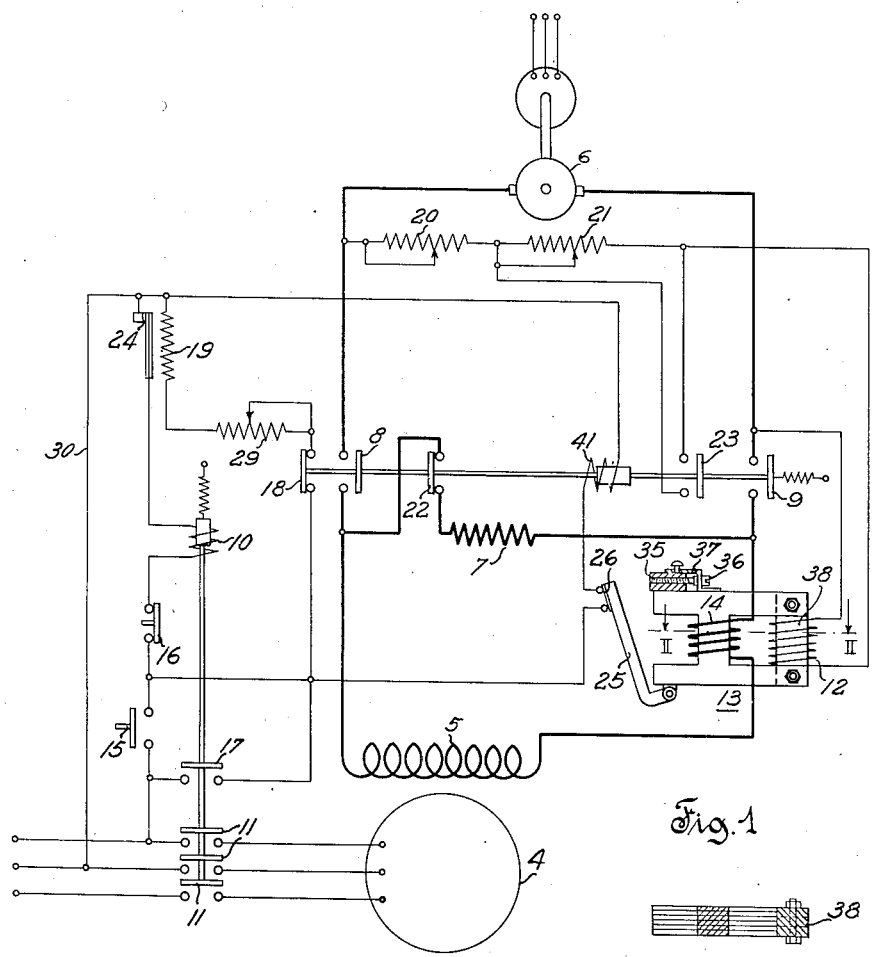
Fig. 1
Fig. 2
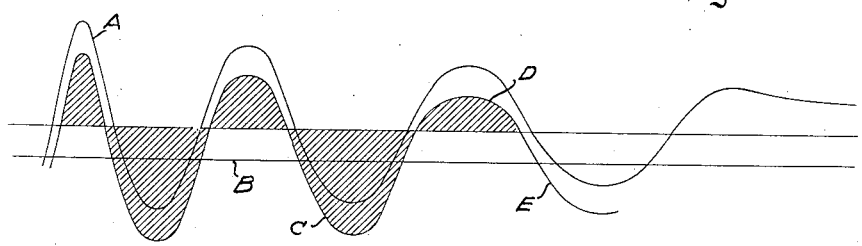
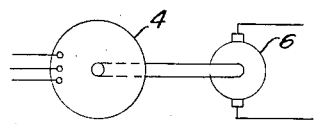
Fig. 3
Fig. 4
INVENTOR
William J. Herziger
BY
Harold J. Silver
ATTORNEY Patented Aug. 9, 1949

2,478,693

UNITED STATES PATENT OFFICE 2,478,693

ELECTRIC MOTOR CONTROL SYSTEM AND APPARATUS

William J. Herziger, Cedarburg, Wis., assignor to Allis-Chalmers Manufacturing Company, Milwaukee, Wis., a corporation of Delaware Application January 19, 1946, Serial No. 642,254

4 Claims. (Cl. 318—176)

1

This invention relates in general to motor control systems and apparatus and relates particularly to a control system and apparatus suitable for the starting or resynchronizing of a synchronous motor.

One of the important problems in the starting or resynchronizing of a synchronous motor is to effect synchronization with a minimum of electrical disturbance to the electrical power supply, a minimum of shock to the load connected to the motor, to permit the synchronous motor to exert maximum torque for pulling the accelerating load into synchronism, and to always effect synchronization at the exact point at which the most favorable stator and rotor relationship occurs.

It is therefore an object of the present invention to provide a control system and apparatus for starting or resynchronizing a synchronous motor which provides the above advantages.

It is also an object of the present invention to provide for starting or resynchronizing a synchronous motor by a control system and apparatus having a relay that is rugged in construction, simple in adjustment and yet accurate in operation.

It is a further object of the present invention to provide a synchronizing control and apparatus that will automatically remove field excitation if the motor should pull out of step, which control system and apparatus will be immediately available for automatic resynchronization.

Objects and advantages other than those above set forth will be apparent from the following description when read in connection with the accompanying drawing, in which:

Fig. 1 is a partly diagrammatic illustration of the connections and apparatus embodied in one form of the invention;

Fig. 2 is a sectional view taken on the line II—II of Fig. 1;

Fig. 3 illustrates the characteristic operation of a relay shown in Fig. 1; and

Fig. 4 shows how the exciter of the embodiment illustrated in Fig. 1 may be driven by the synchronous motor.

In the embodiment illustrated in Fig. 1, a synchronous motor 4 is shown as provided with a field winding 5 which may be energized from any suitable source of direct current such as an exciter 6. The exciter 6 may be driven from the motor 4 or may be driven as shown by a separate motor. The field winding 5 is connected to and disconnected from the exciter 6 by means of contacts 8 and 9 of a field contactor 41. Field

2 contactor 41 is controlled by means of a field application relay 13, which has a contact 26 in circuit with the coil of the field contactor 41, the contact 26 being biased to circuit closing position.

Field application relay 13 is a simple, rugged device operable to close contact 26 during acceleration of motor 4, when the frequency and magnitude of the induced current in field winding 5 have diminished to the desired values. Relay 13 has an alternating current winding 14 which is energized with a current proportional to the current in field winding 5. A coil 12 provides a constant flux in one direction through the core of relay 13, by reason of the energization of coil 12 from a constant voltage direct current source, such as the exciter 6. The armature 25 is operatively responsive to the summation of the fluxes produced by coils 12 and 14.

As shown in Fig. 3, curve A is a portion of a curve illustrating the current induced in the field winding 5 after the contacts 11 have closed the armature circuit of the motor 4, if the contacts 8, 9 and 22 are in their positions as shown in Fig. 1. Curve B similarly illustrates the current flowing in the polarizing coil 12. Curve C is a summation of curves A and B and, therefore, the shaded portions under this curve are measures of the resultant flux in the armature 25 of the relay 13. When this resultant flux has diminished to a predetermined value, shown as point D on curve C, the armature 25 will drop open to the position shown in Fig. 1, in which contact 26 is closed, energizing contactor 41 at the point E on curve C.

The point D on curve C, at which the armature 25 drops open, is simply and easily varied, without affecting the electrical relationship of coils 14 and 12, by adjusting, by any suitable means, the air gap between the armature 25 and the core of relay 13, when the armature 25 is in attracted position. A suitable adjusting means is illustrated in Fig. 1 by a non-magnetic block 35, movable in a support 37 by means of a threaded member 36, so as to extend more or less beyond the end face of the upper core member.

As shown in detail in Fig. 2, the core of relay 13 is laminated except for the portion 38 on which the coil 12 is positioned. The portion 38 provides a path of increased reluctance and, as shown in the embodiment illustrated, is made of solid steel. The leg 38, therefore, provides a high reluctance path for the alternating flux due to coil 14, thereby providing for more of the flux due to coil 14 to be available for actuation of armature 25.

Starting of the motor 4 is initiated by closure of the starting switch 15, thereby energizing the coil of relay 10 through a circuit from one line conductor through starting switch 15, stopping switch 16, coil 10, normally closed contact 24, and conductor 30 to another line conductor. Energization of coil 10 closes contacts 11 and 17; contacts 11 providing for energization of the motor armature and contact 17 providing for sealing in of the energizing circuit of the relay 10.

Immediately upon energization of the armature of motor 4, a current is induced in field winding 5, which current also flows through the normally closed contact 22, the discharge resistor 7 and coil 14 of the relay 13. As the energization of coil 14 is greater than that of coil 12, the resultant flux as shown by curve C in Fig. 3 is sufficient to pick up the armature 25, thereby opening contact 26. Field contactor 41 therefore remains in the position shown in Fig. 1.

As the frequency and magnitude of the induced current in the field winding 5 diminish upon acceleration of the motor 4, the resultant flux diminishes as shown in Fig. 3 to point D on curve C, at which point the biasing force overcomes the force of the resultant flux and the armature 25 drops open, thereby closing contact 26. Closure of contact 26 closes an energizing circuit from one line conductor through contact 17, contact 26, coil 14 and conductor 30 to another line conductor. Energization of contactor 41 closes contacts 8 and 9 applying field energization from exciter 6 to the field 5, and by opening of contact 22, opens the circuit of the discharge resistor 7.

As seen from curve C of Fig. 3, the contact 26 can close only at the proper polarity, thereby providing the least electrical disturbance to the supply line and motor load. As closure of contact 26 is a function of the frequency and magnitude of the field current induced during acceleration, its operation is a direct function of motor speed. By means of the simple air gap adjustment, contact 26 can be made to close when the motor 4 has accelerated to 93% to 98% of synchronous speed. The contact 26 will, therefore, be closed with unvarying accuracy over a number of operations, only at the most favorable relationship of rotor and stator poles, with least shock to line and load, and with maximum available pull-in torque.

After closure of field contactor 41, normal exciting current will flow in the coil 14 of the relay 13, and to provide a proper desired balance of the magnetic effects of coils 12 and 14, a contact 23 closes a shunt circuit around the resistor 21 in circuit with coil 12. If the motor 4 should pull out of step due to sudden overload or due to momentary dip in voltage, a surge of alternating current is immediately induced in the field winding 5. Such induced current flowing in the winding 14 of relay 13 will immediately pick up the armature 25, thereby opening the energizing circuit for the field contactor 41, thereby disconnecting the field winding 5 from the exciter 6 at contacts 8 and 9. When normal line voltage is restored or the overload has subsided, the relay 13 is again available for resynchronizing the motor and excitation will be applied to the field winding 5 in the manner above described. If desired, the dropping out of contact 26 could instead be utilized to trip the motor circuit breaker.

A safety relay 24 may be provided in the circuit of relay 10, and such relay is illustrated in Fig. 1 as a thermal relay having a heater coil 19 energized through a circuit from one side of the line through contact 17, a normally closed contact 18 of the field contactor 41, resistance 29, heater 19, conductor 30 to another line conductor. If the relays 13 or 41 should fail to operate within a desired predetermined time, the heater 19 would cause the contact 24 to open thereby opening the energizing circuit of relay 10 to deenergize the motor 4.

Although, as above stated, the source of energization for the biasing winding 12 may be any suitable constant voltage direct current source, it is preferable for the most desirable operation, that the winding 12 be energized from the exciter 6, in the event such exciter is driven by the motor 4.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system comprising a synchronous motor having an armature winding and a field winding, a source of alternating current, a source of direct current, and means for connecting said armature winding to said source of alternating current, the combination of switching means for connecting said field winding to said source of direct current, a relay having a first coil supplied with a substantially constant direct current and a second coil supplied with a current proportional to the current induced in said field winding for controlling the operation of said switching means, and means responsive to field connecting operation of said switching means for increasing the value of said substantially constant direct current.

2. In a system comprising a synchronous motor having an armature winding and a field winding, a source of alternating current, means for connecting said armature winding to said source of alternating current, and a source of excitation current, the combination of switching means for connecting said field winding to said source of excitation current, a relay having a first coil supplied with a substantially constant direct current from said source of excitation current and a second coil supplied with a current proportional to the current of said field winding for controlling the operation of said switching means, and means responsive to the closing operation of said switching means for increasing the value of said substantially constant direct current.

3. In a system comprising a synchronous motor having an armature winding and a field winding, a source of alternating current, and means for connecting said armature winding to said source of alternating current, the combination of a direct current exciter driven by said synchronous motor, and means for connecting said field winding to said exciter, said last mentioned means comprising a relay provided with a first flux producing winding, a second flux producing winding, and an armature responsive to the joint effect of the fluxes produced by said first flux producing and second flux producing windings, said first winding being connected to carry a current proportional to the current of said field winding, said second flux producing winding being connected to said exciter to subject said armature to a unidirectional flux component which increases from the value zero to a predetermined value in response to acceleration of said motor from rest to the speed which results in operation of said relay for connecting said field winding to said exciter.

4. In a control system for a synchronous motor, in combination, a synchronous motor having an armature winding and a field winding, a source of alternating current, a source of direct current, means for connecting said armature winding to said source of alternating current, means for connecting said field winding to said source of direct current, said last mentioned means comprising a relay operatively responsive to the summation of a substantially constant biasing flux and a second flux, said relay comprising a coil serially connected with said field winding and traversed by the entire current of said field winding to cause the magnitude of said second flux to be proportional to the current induced in said field winding and independent of the frequency thereof when said armature winding is connected to said source of alternating current, and means for varying the value of said substantially constant biasing flux in response to operation of said means for connecting said field winding to said source of direct current to adjust the relation between said biasing flux and the flux produced by the current supplied from said source of direct current to said field winding through said coil.

WILLIAM J. HERZIGER.

REFERENCES CITED

The following references are of record in the file of this patent:

UNITED STATES PATENTS

| Number | Name | Date |
|---|---|---|
| 1,633,938 | Goodwin | June 28, 1927 |
| 1,640,323 | Hibbard | Aug. 23, 1927 |
| 1,768,788 | Reagan | July 1, 1930 |
| 1,821,358 | Reagan | Sept. 1, 1931 |
| 2,063,077 | Bany et al. | Dec. 8, 1936 |
| 2,125,140 | Wright | July 26, 1938 |
| 2,202,998 | Seeger et al. | June 4, 1940 |
| 2,304,542 | Chambers | Dec. 8, 1942 |
| 2,323,485 | Pell | July 6, 1943 |
| 2,407,121 | Winter | Sept. 3, 1946 |
| 2,408,226 | Pringle | Sept. 24, 1946 |

FOREIGN PATENTS

| Number | Country | Date |
|---|---|---|
| 651,521 | Germany | Oct. 14, 1937 |